United States Patent
Agarwal et al.

(10) Patent No.: US 7,177,614 B2
(45) Date of Patent: Feb. 13, 2007

(54) NARROWBAND NOISE MITIGATION IN LOCATION-DETERMINING SIGNAL PROCESSING

(75) Inventors: Nainesh Agarwal, Victoria (CA); Anant Sahai, Berkeley, CA (US); John Tsitsiklis, Lexington, MA (US)

(73) Assignee: SiRF Technology, Inc., San Jose, CA (US)

( * ) Notice: Subject to any disclaimer, the term of this patent is extended or adjusted under 35 U.S.C. 154(b) by 264 days.

(21) Appl. No.: 10/334,683

(22) Filed: Dec. 31, 2002
(Under 37 CFR 1.47)

(65) Prior Publication Data
US 2004/0174943 A1 Sep. 9, 2004

Related U.S. Application Data

(60) Provisional application No. 60/386,212, filed on Jan. 2, 2002, provisional application No. 60/410,437, filed on Sep. 13, 2002.

(51) Int. Cl.
*H04B 1/10* (2006.01)
(52) U.S. Cl. ................. 455/296; 455/272.2; 455/278.1
(58) Field of Classification Search ............. 455/278.1, 455/427, 3.02, 306, 307, 311, 501, 138, 67.13, 455/550.1, 272.1, 296, 134–135; 375/148, 375/200
See application file for complete search history.

(56) References Cited

U.S. PATENT DOCUMENTS

| 4,658,426 A | | 4/1987 | Chabries et al. |
| 5,410,750 A | * | 4/1995 | Cantwell et al. ............. 455/306 |
| 5,612,978 A | | 3/1997 | Blanchared et al. |
| 6,560,445 B1 | * | 5/2003 | Fette et al. ................... 455/91 |
| 6,615,024 B1 | * | 9/2003 | Boros et al. ............. 455/67.14 |

* cited by examiner

*Primary Examiner*—Edward F. Urban
*Assistant Examiner*—Tu X. Nguyen
(74) *Attorney, Agent, or Firm*—Edward C. Kwok; MacPherson Kwok Chen & Heid LLP

(57) ABSTRACT

System and method for mitigating the effects of narrowband noise in a location-determining signal are provided, wherein the location-determining signal is associated with a periodic reference signal, the embodiments include identifying a set of noisy frequencies in the signal, determining a set of frequencies to be removed, and removing the set of frequencies from either the location-determining signal or the reference signal, thereby removing the effects of narrowband noise from the location-determining signal.

77 Claims, 7 Drawing Sheets

NARROWBAND NOISE MITIGATION IN LOCATION-DETERMINING SIGNAL PROCESSING

CROSS REFERENCE TO RELATED APPLICATIONS

This application claims priority to, and hereby incorporates by reference for all purposes, U.S. patent application Ser. No. 60/386,212 entitled "Systems and Methods for Identifying and Removing the Effects of Narrowband Noise from Location-Determining Signals", filed on Jan. 2, 2002, and U.S. patent application Ser. No. 60/410,437 entitled "Systems and Methods for Removing Narrowband Noise from Location Determining Signals", filed on Sep. 13, 2002.

FIELD

The present invention relates to signal processing. In particular, the present invention relates to systems and methods for mitigating the effects of narrowband noise in location determining signals.

BACKGROUND

The effectiveness and accuracy of signal receiving devices can be impaired by undesirable interference and noise. Such undesirable interference can be particularly disruptive in signal receiving devices that receive and process location-determining signals, such as the signals generated by the Global Positioning System constellation of satellites. Undesirable interference in these signals can cause errors in the operation of receivers, potentially reducing the sensitivity, accuracy and effectiveness of the receivers. In general, when a receiver receives a signal that can be used to determine the location of the receiver, the signal may be corrupted by various types of interference. Some interference may be white or broadband noise. Standard matched filtering and testing by means of correlation calculations performs well when the noise is nearly white. If standard correlation techniques are used in the presence of significant narrowband noise, then the noise alone can often cause false correlation peaks. These peaks will occur much more frequently than a model based on pure white noise would predict. With relatively strong location determining signals, this does not pose a major issue since these peaks still tend to be much lower than the true correlation peaks coming from the actual signals. However, if it is desired to extend sensitivity into the much lower SNR regimes, then the peaks from narrowband noise can result in false-positives that turn into completely erroneous satellite acquisitions and then into erroneous locations. Also, at these lower SNRs, the narrowband noise induced correlations can cause significant apparent local movement in the position of true correlation peaks. This translates into larger than expected position errors. Often, there can be significant amounts of narrowband noise. Narrowband noise can be caused by, for example, interference from other devices or by operation of the receiving device itself. Such noise can have a detrimental effect on the processing of the received signal, potentially resulting in substantial errors in determining the location of the receiver. It is desirable to mitigate the effects of narrowband noise before further processing of such signals.

One approach to removing such noise is to form the Fourier transform (or, in the case of sampled data, the fast Fourier transform) of a received signal, identify the noisy frequencies as those having unusually large values, and remove the corresponding frequency components from the signal. Unfortunately, however, this approach is computationally intensive, particularly when the received signal is long. It would be desirable to provide a system and method that allows computationally efficient identification and removal of narrowband noise, or alternatively, is robust to the effects of narrowband noise Other techniques for removing narrowband noise rely on the use of various types of adaptive notch filters, which often require time-domain processing of the signal. Such techniques are undesirable at least because they may require a large number of such filters (particularly where there are multiple sources of noise). Further, if the signal to be filtered has a limited duration, an adaptive filter may have insufficient exposure to the signal to tune itself to the frequencies that require notching. With the exact identification of the spectral characteristics of narrowband noise, and an estimate of the signal power, standard Bayesian techniques can be used to optimally weigh the signal components in a detection algorithm without having to directly modify the noisy signal. However, such techniques rely on knowing both the detailed characteristics of the noise (such as assuming Gaussianity) and in having an estimate of signal power available. However, in the case of location-determining signals, there can be a very wide range of possible signal powers and in general an estimate for signal power will only be available after detection has already succeeded.

Accordingly, there is a need for a system and method that allows the efficient and accurate identification and removal of undesirable frequencies in a computationally efficient manner.

SUMMARY

To alleviate problems inherent in the prior art, the present invention introduces systems, methods, and means for mitigating the effects of narrowband noise in location-determining signals.

According to some embodiments, a system, method, and means for removing the effects of narrowband noise from a location-determining signal are provided, wherein the embodiments include identifying a set of undesirable frequencies in the signal, determining a set of undesirable frequencies to be removed, and removing these frequencies from the subsequent correlation calculations, thereby removing the effects of narrowband noise from the location-determining signal. The undesirable frequencies are removed by adjusting either the (preprocessed) received signal or the reference signals used to calculate the correlations. This adjustment is performed by zeroing out certain FFT coefficients, as explained in more detail later.

According to some embodiments, the set of noisy frequencies are identified by selecting one or more blocks of the signal, each having a length (L), and calculating a fast Fourier transform (FFT) on each of the blocks to generate a number of coefficients, each having a magnitude. Some embodiments generate a set of combined magnitudes that are compared to a threshold to identify the set of noisy frequencies.

The proposed system and method to mitigate the effects of narrowband noise yields the following advantages:

a) By identifying narrowband noise on an instance by instance basis, we are able to deal with a variety of new circumstances without having to always sacrifice sensitivity in the fear of the worst case.

b) By identifying narrowband noise using a subset of the original signal, we can save significantly on the computation and also potentially have the narrowband noise identification vary over the course of the signal being processed if the noise itself is time varying.

c) When the narrowband noise frequencies are removed from the reference signal (e.g. the PRN code), the computational overhead of narrowband noise robustness is almost neglible because we do not have to modify those parts of the algorithm that need to touch every incoming sample.

d) The approaches are well suited to implementation in software as opposed to being done using RF or analog circuitry.

e) In general, being robust to the narrowband noise lets us push our sensitivity to very low SNRs without being overwhelmed with noise-related false-positives.

According to one embodiment, a system, method, apparatus, computer program code, and means for identifying narrowband noise in a location-determining signal includes receiving a signal, selecting a block of the signal (where the block has a length), calculating a fast Fourier transform (FFT) of the block (where the FFT of the block has a plurality of coefficients each having a magnitude), and comparing the magnitudes to a threshold to identify narrowband noise in the signal.

According to some embodiments, a plurality of blocks are selected and processed to identify narrowband noise in the signal. According to some embodiments, the plurality of blocks are non-contiguous blocks dispersed within said signal. According to some embodiments, the plurality of blocks are contiguous blocks within said signal.

According to some embodiments, the magnitudes of the coefficients from each of the blocks are combined and the combined magnitude is compared to a threshold to identify narrowband noise. In some embodiments, the combined magnitude is determined by adding the magnitudes of each of the blocks. In some embodiments, the combined magnitude is determined by squaring the magnitudes of each of the blocks and adding the squared magnitudes.

According to some embodiments, the threshold is selected to maintain a desired level of signal energy in the signal. In some embodiments, the threshold is selected based on a length of the signal. In some embodiments, the threshold is selected based on a combined length of the blocks.

According to some embodiments, one or more of the steps of identifying narrowband noise in a signal are performed by a receiver device. In some embodiments, one or more of the steps of identifying narrowband noise in a signal are performed by a server device in communication with a receiver device. According to some embodiments, the signal is a preprocessed signal. In some embodiments, the location-determining signal is a GPS signal.

According to some embodiments, a system, method, apparatus, computer program code, and means for removing narrowband noise from a location-determining signal includes identifying an undesirable frequency in the location-determining signal, wherein the undesirable frequency is associated with narrowband noise. The signal is partitioned into a plurality of blocks, each of the blocks having a length (M). A frequency to be removed from the signal is identified, and a fast Fourier transform (FFT) for each of the blocks is calculated. The FFT of each of the blocks has a plurality of coefficients. For each of the blocks, the coefficients corresponding to the frequency to be removed are zeroed out.

According to some embodiments, the undesirable frequency is identified by selecting a plurality of blocks of the signal, each of the blocks having a length (L). A fast Fourier transform (FFT) of each of the blocks is calculated, the FFT of each of the blocks having a plurality of coefficients each having a magnitude. The coefficients are combined to form a combined magnitude. The combined magnitude is compared to a threshold to identify the undesirable frequency.

According to some embodiments, a number of undesirable frequencies are identified. In some embodiments, the length (L) and the length (M) are different. In some embodiments L is greater than M; in others, M is equal to L. In some embodiments, L is selected to be small in comparison to an overall duration of the signal. In some embodiments, the undesirable frequency is removed. In some embodiments, frequencies adjacent to each undesirable frequency are removed. In some embodiments, the number of adjacent frequencies to be removed is determined based on the power of the narrowband noise in the signal near the undesirable frequency.

According to some embodiments, a system, method, apparatus, computer program code, and means for removing noise from a location-determining signal by identifying a first set of frequencies in the signal, wherein each frequency of the first set is associated with narrowband noise. The signal is partitioned into a plurality of blocks, each having a length (M). A second set of frequencies to be removed from the signal are identified. A fast Fourier transform (FFT) is calculated for each block, each FFT having a plurality of coefficients. Coefficients corresponding to a frequency in the second set of frequencies are removed from each block.

With these and other advantages and features of the invention that will become hereinafter apparent, the invention may be more clearly understood by reference to the following detailed description of the invention, the appended claims, and the drawings attached herein.

DETAILED DESCRIPTION

Applicants have recognized that there is a need for systems, methods, and means for mitigating the effects of narrowband noise in location-determining signals. Embodiments of the present invention result in increased performance and accuracy in devices and systems that receive and utilize location-determining signals.

Pursuant to some embodiments of the present invention, a particular class of noise is considered—a class of noise and interference which may be modeled by a combination of wideband white noise and narrowband noise that represents strongly colored interference or noise that has its power concentrated in a few frequencies. Pursuant to some embodiments of the present invention, the narrowband noise parameters are first identified by looking at a subset of a received signal rather than the entire signal. The algorithms for processing the location-determining signals are then modified to take this identification into account. Pursuant to some embodiments of the present invention, one strategy for modifying these algorithms is to first try to remove the narrowband noise from the signal and then to apply an algorithm that performs well against wideband noise. In this embodiment, the narrowband noise can be approximately removed. In some embodiments, the wideband algorithm is modified to explicitly be robust to the narrowband noise by altering the representations of certain reference signals to be used within the location-determining algorithm.

As used herein, the term location-determining signal is used to refer to any signal or signals that may be received by receiving devices and used to determine location information. For example, location-determining signals may be signals generated by the Global Positioning System (GPS) or other satellite positioning systems. Those skilled in the art will recognize that features of embodiments of the present invention may be used to identify and/or remove noise in other types of signals as well.

Figure 1:
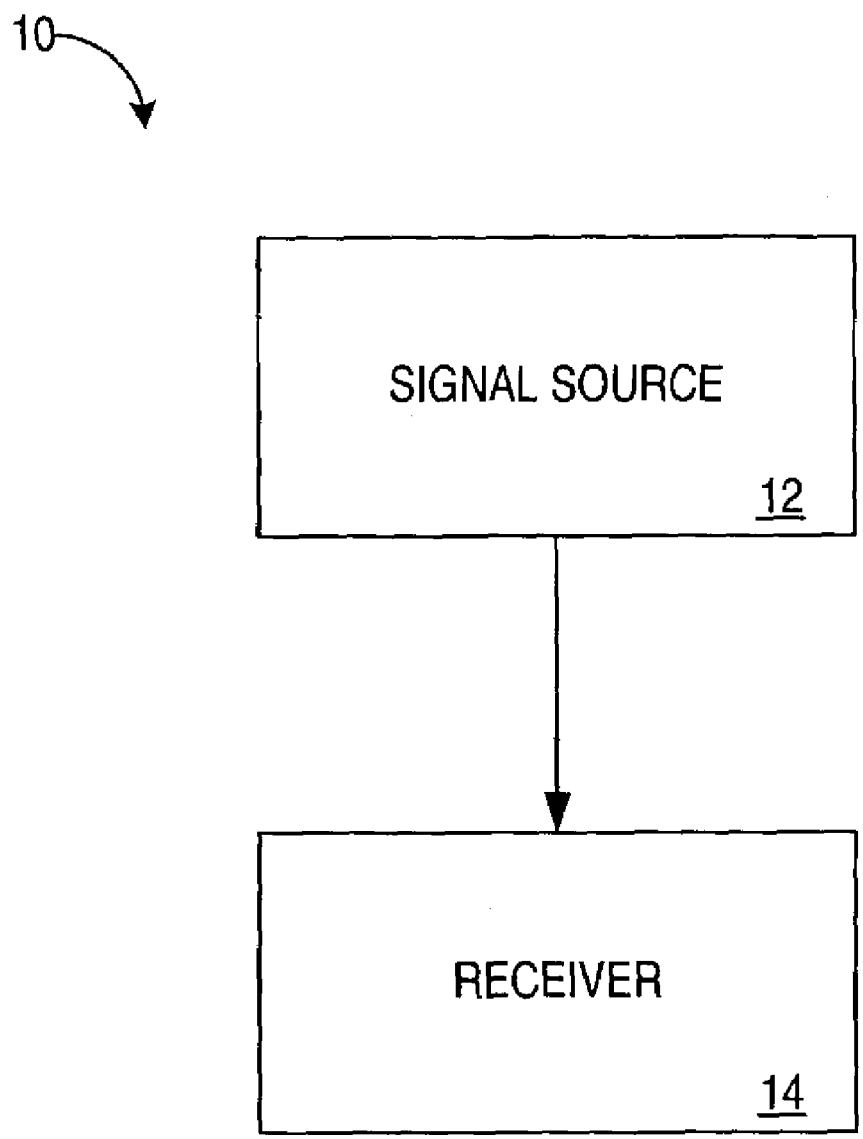
FIG. 1 is a block diagram overview of a system according to an embodiment of the present invention.

Features of embodiments of the present invention will now be described by first referring to FIG. 1, where a system 10 is shown which includes a signal source 12 and a receiver 14. Signal source 12 transmits a signal $s_k$ which may be received by a number of receivers, including receiver 14. As an example, in one embodiment, signal source 12 is a Global Positioning System (GPS) satellite transmitting a GPS signal. In this example embodiment, receiver 14 is a GPS receiver configured to receive GPS signals transmitted from GPS satellites. Receiver 14 may be any of a number of different types of devices, including a dedicated GPS receiver or other device having an integrated GPS receiver therein, such as a cellular telephone, a personal digital assistant (PDA), a computer, etc. In some embodiments, a system employing features of the present invention includes a number of signal sources 12 and a number of receivers 14. Each receiver 14 may receive a signal $x_k$ which may be formed from one or more signals $s_k$ received from signal sources 12. The received signal $x_k$ may additionally be transformed by the effects of propagation delay and relative motion.

The performance of receiver 14, and the ability to process and utilize a received signal $x_k$, can be impaired due to interference from narrowband noise. This narrowband noise can be identified and/or removed using techniques of embodiments of the present invention. In some embodiments, the narrowband noise is identified and/or removed under the control of receiver 14 (e.g., using signal processing devices and/or software). For example, some or all of the processing tasks described below may be performed under the control of receiver 14. In some embodiments, narrowband noise is identified and/or removed under partial control of receiver 14 in conjunction with one or more other devices in communication with receiver 14.

Figure 2:
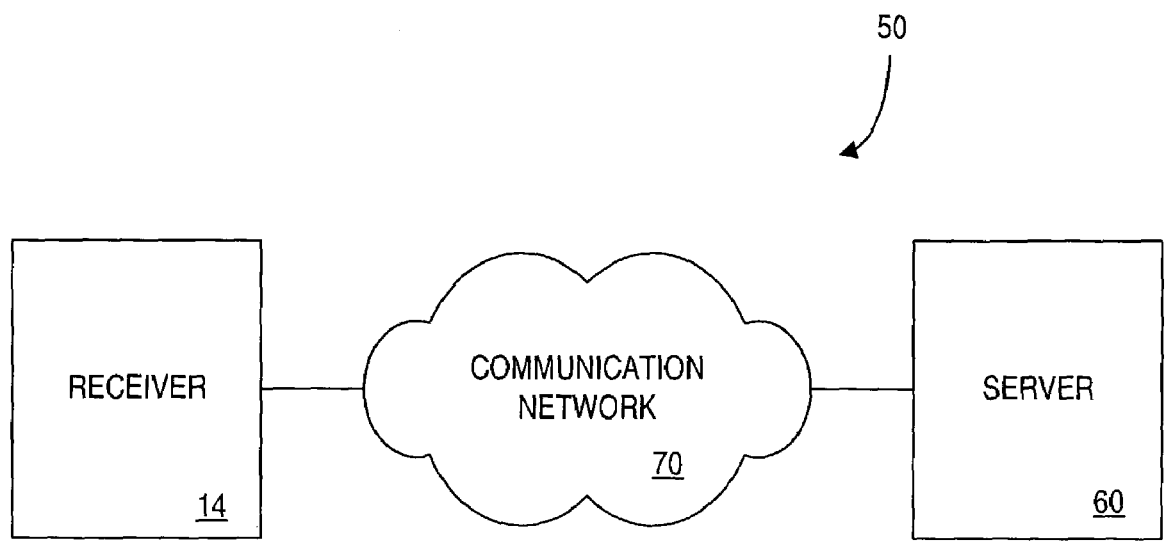
FIG. 2 is a block diagram overview of a system according to an embodiment of the present invention.

For example, referring now to FIG. 2, a system 50 pursuant to some embodiments of the present invention is depicted in which receiver 14 is in communication with a server 60 through a communication network 70. Pursuant to some embodiments of the present invention, narrowband noise may be identified and/or removed under the control of both receiver 14 and server 60. For example, some or all of the processing tasks described below may be performed by server 60.

Communication network 70 allows communication among a number of devices, including one or more receivers 14 and one or more servers 60. In one example embodiment, receivers 14 are GPS receivers with the ability to receive GPS signals and the ability to send and receive data via network 70 and server 60 is a network server performing network functions such as storing network files, etc. Server 60 may also be a differential GPS server.

As used herein, communication network 70 may employ any of a number of different types and modes of communication, and may be for example, a Local Area Network (LAN), a Metropolitan Area Network (MAN), a Wide Area Network (WAN), a proprietary network, a Public Switched Telephone Network (PSTN), a Wireless Application Protocol (WAP) network, a wireless network, a cable television network, or an Internet Protocol (IP) network such as the Internet, an intranet or an extranet. Moreover, as used herein, communications include those enabled by wired or wireless technology. In one example embodiment, communication network 70 is the Internet and server 60 is a network server accessible via the Internet.

Figure 3:
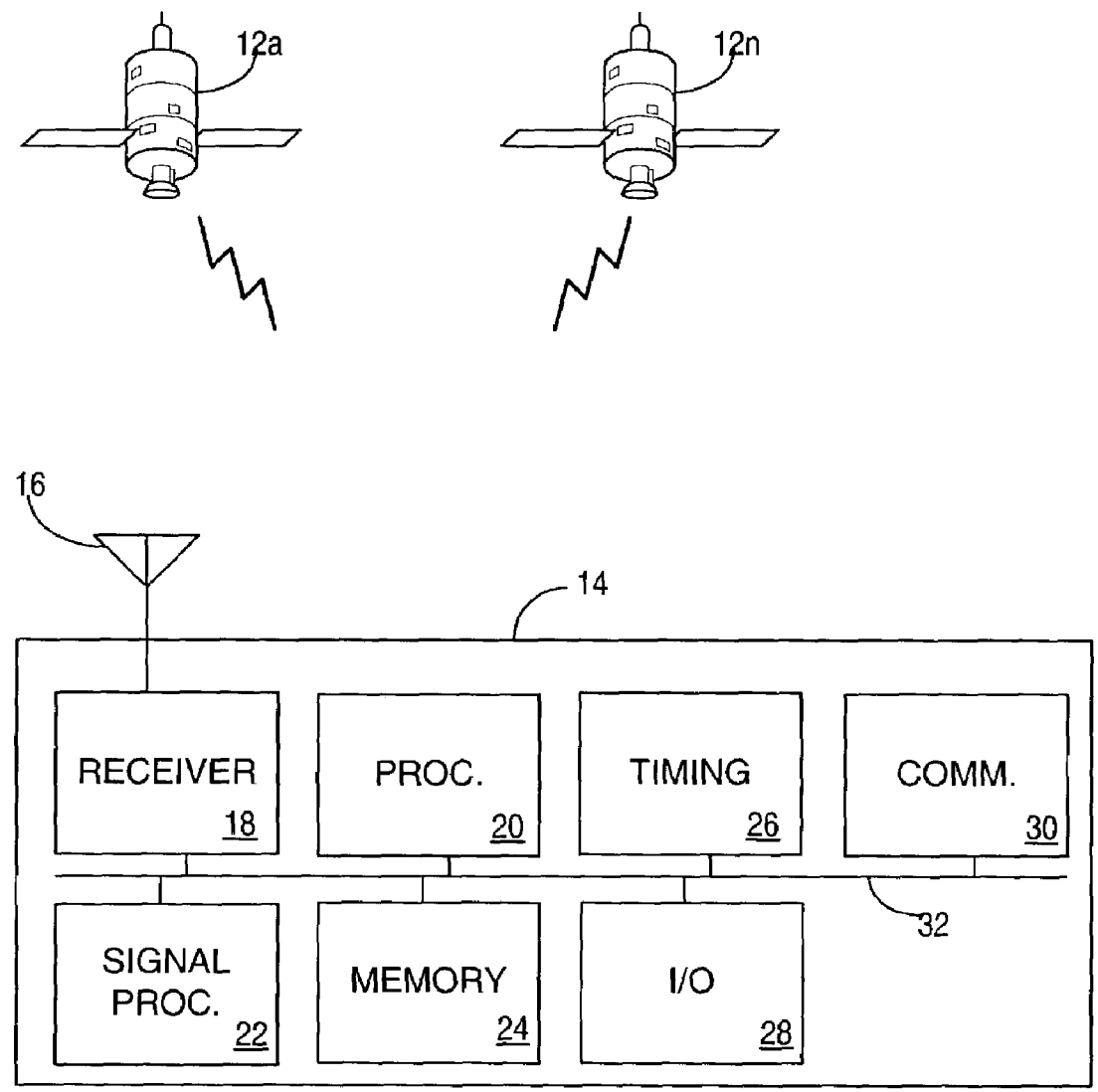
FIG. 3 is a block diagram of a receiver according to an embodiment of the present invention.

Referring now to FIG. 3, a more detailed block diagram of receiver 14 is shown. As depicted, receiver 14 includes an antenna 16, a receiver device 18, a processor 20, a signal processor 22, a memory 24, timing 26, I/O 28 and a communications device 30 each in communication with each other via a bus 32. In embodiments where receiver 14 is a GPS receiver, antenna 16 is an antenna configured to receive radio frequency (RF) GPS signals from GPS satellites and to pass the signals to receiver device 18 which is a GPS receiver device adapted to manipulate the received RF signals. As used herein, antenna 16 may be any of a number of different types and combinations of antennas including, for example, fixed antenna, adaptive antenna or any composite antenna that may be composed of multiple individual antennae, such as a phased array antennae. Communications device 30 may be any of a number of communications devices allowing remote communication with other devices, such as, for example, a server.

Components of receiver 14 may be configured and selected as is known in the art. Further, those skilled in the art will recognize that other configurations of receivers 14 may also be used in conjunction with embodiments of the present invention.

Figure 4:
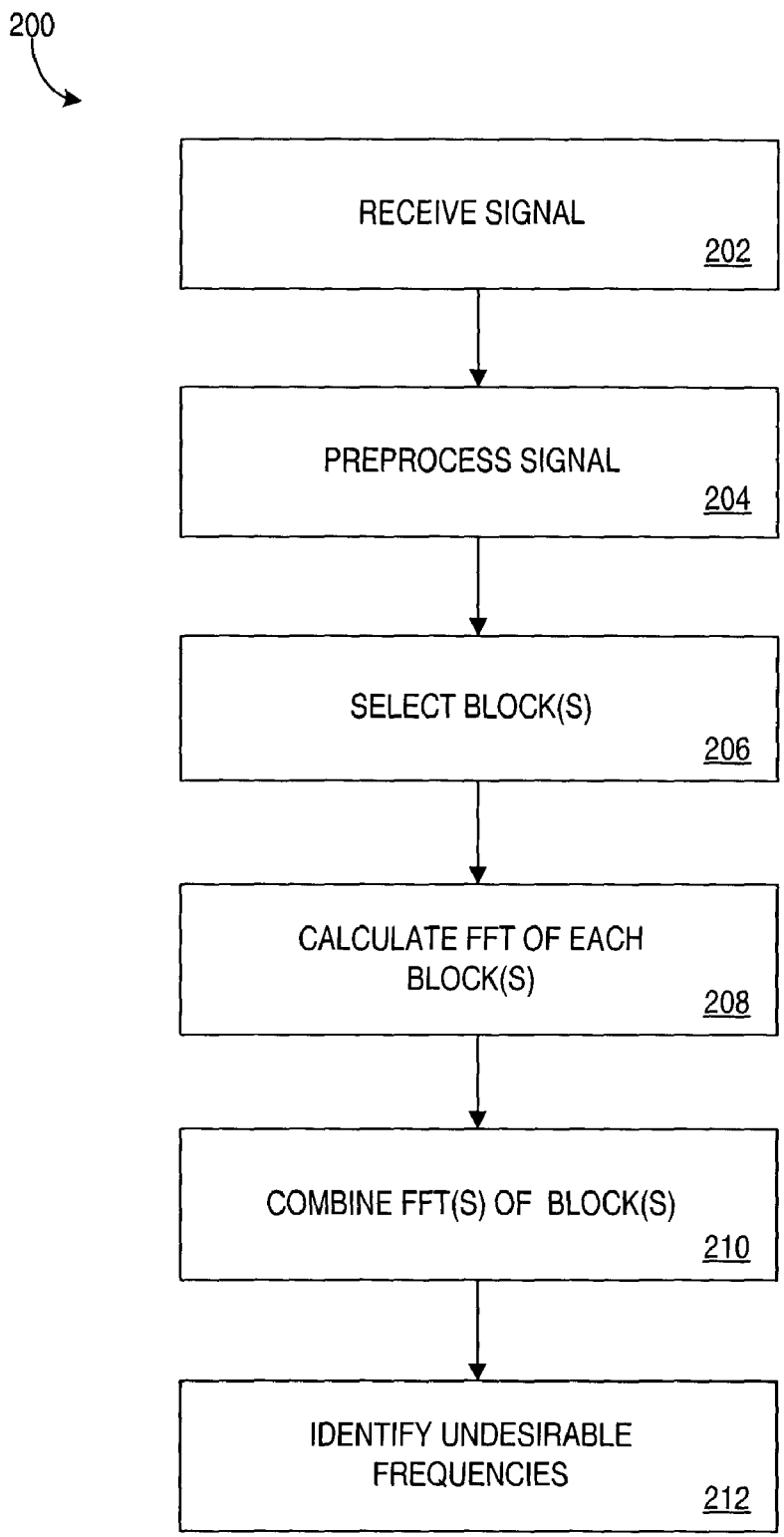
FIG. 4 is a flow chart of a noise identification method according to some embodiments of the present invention.

Referring now to FIG. 4, a flow diagram is shown depicting a process 200 for identifying noise in a signal. The particular arrangement of elements in the flow chart of FIG. 4 (or the other flow charts presented herein) is not meant to imply a fixed order to the steps; embodiments of the present invention can be practiced in any order that is practicable. Process 200 begins at 202 where a signal is received by a receiver 14. In some embodiments, the signal is a location-determining signal. For example, the signal may be a received by a GPS receiver that samples within the GPS band. For the purposes of explaining features of embodiments of the present invention, the signal is a digitized, sampled-data location-determining signal $x_k$ with k=1, ..., N, and where N=the number of samples of the received signal.

Preprocessing

Processing continues at 204 where the signal $x_k$ received at 202 is preprocessed to generate a preprocessed signal $y_k$. The nature of preprocessing performed at 204 may depend, for example, on the nature of the signal received and the application for which the signal is to be used. For example, the preprocessing performed at 204 may include decimation, quantization, downsampling, lowpass filtering, bandpass filtering, and/or mixing in order to change the carrier frequency of the signal $x_k$. As an example, the resulting preprocessed signal may be represented in the form of formula (1) set forth below.

$$y_k = \sum_{i=1}^{I} \alpha_i r_k^i(\sigma^i) e^{2\pi j (f_{IF} + f^i + f_0^i)k + \pi \phi_j} + w_k + n_k \quad k = 1, \ldots, N \quad (1)$$

For the remainder of this disclosure, features of embodiments of the present invention will be described by referring to a preprocessed signal having the form set forth in formula (1). Those skilled in the art will recognize that features of embodiments of the present invention may be used to identify and/or mitigate noise from signals having different forms. Further, those skilled in the art will recognize that features of embodiments of the present invention may be used to identify and/or remove noise from signals which have not been preprocessed.

As depicted in formula (1), $r_k^i(\sigma_i)$ is a signal of known structure representing a reference signal (which may or may not have been filtered) from an i-th signal source. For example, in embodiments where features of the present invention are used to identify and/or remove noise from GPS navigational signals, $r_k^i(\sigma_i)$ represents a reference signal received from an i-th GPS satellite. Furthermore, $\alpha_i$ is a typically unknown amplitude parameter at receiver 14 which is associated with the reference signal from the i-th source.

As depicted in formula (1), $\sigma_i$ is an unknown parameter that represents a shift in time of the reference signal $r_k^i$. In an embodiment used to identify and/or remove noise from GPS navigational signals, the shift $\sigma_i$ is closely related to GPS pseudoranges.

As depicted in formula (1), $f_{IF}$ is a known intermediate frequency which reflects the known carrier frequency of the received signal $x_k$ and the amount of frequency mixing employed by receiver 14. In some embodiments, for example, the preprocessed signal $y_k$ is moved to baseband. In such an embodiment, the intermediate frequency is equal to zero. As depicted in formula (1), $f^i$ is a frequency shift (such as, for example, a Doppler shift commonly arising in GPS systems) caused by the known movement of the i-th signal source relative to a hypothetical stationary receiver. For example, such hypothetical receiver is one located at a known approximate location on the Earth's surface.

As depicted in formula (1), $f_0^i$ is an additional frequency shift caused by, for example, unknown motion of receiver 14, by a clock drift at receiver 14, or by the displacement of receiver 14 from the known approximate location. In a typical GPS system, the frequency shifts $f^i$ and $f_0^i$ are small compared with the bandwidth of the preprocessed signal $y_k$. For example, in a typical GPS application, the bandwidth of the preprocessed signal $y_k$ is in the Megahertz range, while the frequency shifts $f^i$ and $f_0^i$ are of the order of a few Kilohertz. Typically, these frequency shifts can be assumed to be known to within some accuracy. For example, in the context of GPS, the frequency shift $f^i$ can be determined from aiding data containing ephemeris information on the GPS satellite constellation along with information identifying the approximate location and time of receiver 14.

As depicted in formula (1), $\phi_i$ represents an unknown phase shift and $w_k$ represents broadband noise. Typically, this broadband noise may be modeled as bandpassed-filtered white noise. Finally, the variable $n_k$ in formula (1) represents narrowband noise, that is, noise whose power is concentrated in narrow frequency bands.

Estimation of Narrowband Noise Frequencies

Once the received signal $x_k$ has been preprocessed to generate a preprocessed signal $y_k$, processing continues at 206 where a block length L is selected, and one or more data blocks of length L are selected from the preprocessed signal $y_k$. The size of L may be selected based on considerations such as the need to balance computational and processing requirements with accuracy. For example, a larger block length will place greater demands on processing (which may be undesirable, particularly if receiver 14 is a handheld, battery operated device), yet will result in more accurate identification of narrowband noise. In general, it is assumed that the noise is sufficiently stationary throughout the entire duration of the preprocessed signal. As an example in a GPS environment where the GPS navigation signal is sampled at 4 MHz, Applicants have found that a block length of 65,536 (or, 16 milliseconds) is a convenient value that trades off the desire to minimize computational demands while providing reasonable accuracy. Those skilled in the art will recognize that other block lengths may be selected based on particular devices and applications.

One or more data blocks of length L are selected from the preprocessed signal $y_k$. In some embodiments, a single data block of length L is selected from the preprocessed signal. In some embodiments, several contiguous blocks of length L are selected from the preprocessed signal. In some embodiments, several non-contiguous blocks of length L are selected, interspersed throughout the duration of the preprocessed signal $y_k$.

Processing continues at 208 where fast Fourier transforms (FFTs) are computed for each of the blocks selected at 206. In some embodiments, the FFTs calculated at 208 are FFTs of a baseband version of each selected data block of length L. The baseband values of each data block ($y_{a_l+1}, \ldots y_{a_l+L}$, for the l-th block) are of the form:

$$y_k e^{-2\pi j f_{IF} k}, \text{ where } k = a_l+1, \ldots, a_l+L. \quad (2)$$

Processing at 208 pursuant to some embodiments results in a set of FFT coefficients $H_l(f)$ of the form:

$$H_l(f) = \sum_{k=1}^{L} y_k e^{-2\pi j f_{IF} k} e^{-2\pi j f k}. \quad (3)$$

These FFT coefficients are calculated for L different frequencies f that are integer multiples of 1/L, namely, the frequencies 1/L, 2/L ... L/L. In other embodiments, other sets of L consecutive integer multiples of the fundamental frequency 1/L can be used.

Processing continues at 210 where the FFT coefficients $H_l(f)$ obtained from each of the blocks are processed to generate values G(f). In some embodiments, the FFT coefficients $H_l(f)$ are combined by combining the squared magnitudes of each of the FFT coefficients at each frequency. For example, G(f) may be formed as:

$$G(f) = \sum_l |H_l(f)|^2 \text{ for } f = 1/L, \ldots, L/L. \quad (4)$$

In some embodiments, the FFT coefficients are combined by combining the absolute value of the magnitudes of each of the FFT coefficients at each frequency. For example, G(f) may be formed as:

$$G(f) = \sum_l |H_l(f)| \text{ for } f = 1/L, \ldots, L/L. \qquad (5)$$

Processing continues at 212 where undesirable frequencies are identified. As used herein, "undesirable" frequencies may be those frequencies corrupted by narrowband noise. Generally, a frequency "corrupted" by narrowband noise is one in which it is suspected that narrowband noise has significant power. In some embodiments, processing at 212 includes selecting a set F containing all frequencies in the set {1/L, 2/L . . . L/L} for which G(f) exceeds a certain threshold t. The value of the threshold may be set to balance the amount of signal strength which would be lost if the frequency were zeroed out with the amount of narrowband noise which would remain if the frequency were not zeroed out. For example, in a GPS environment, a threshold value of 80 times the median value of G(f) is believed to strike a reasonable balance between lost signal strength and retained narrowband noise. In some embodiments, it may not be necessary to explicitly calculate the median value for G(f) in the above. From the appropriate model of white noise, it is possible in some implementations to work out approximately what the median should be without having to see any data at all. Those skilled in the art will recognize that other threshold values may be selected to achieve different balances of lost signal strength and retained noise. In some embodiments, the threshold is selected based, at least in part, on the length of the signal.

In some embodiments, selection of the threshold is a function of how low the signal power is of the location-determining signals that we wish to detect. This is because the narrowband noise induced correlation peaks should not be confused with the true correlation peaks. Because a location-determining algorithm might be searching for different signal powers at different times during its execution (for example, a location-determining algorithm could search for stronger signals first by looking at the initial part of the captured signal and then progress to looking for weaker and weaker signals as it increases the duration of data to be processed), in some implementations it can be useful or even necessary to be able to vary the threshold used in different parts of the algorithm. Fortunately, pursuant to some embodiments of the present invention, this does not require the system to do the entire work of identifying narrowband noise over and over based on what the threshold is. Rather, the coefficient and frequency pairs (G(f),f) can be stored in a sorted list in decreasing order of G(f). Then, whenever a new threshold is used, the appropriate initial segment of the list can be used.

In some embodiments of the present invention, some or all of the steps of process 200 are performed by receiver 14. In some embodiments of the present invention, some or all of the steps of process 200 are performed by server 60. In some embodiments of the present invention, some of the steps of process 200 are performed by receiver 14, while other steps are performed by server 60. In some embodiments, some or all of the steps of process 200 may be performed using specially adapted hardware, such as, for example one or more ASICs, digital signal processors, or the like. In some embodiments, some or all of the steps of process 200 may be performed using software techniques.

The result is the identification of undesirable frequencies using computationally efficient techniques.

If the noise is not considered to be sufficiently stationary over the entire length, then the blocks of L should be spaced apart by the amount of time at which stationary is believed to break down. This time may depend on an estimate of speed (for example, if the receiver is held by a walking person, then the receiver can move away from and close to interfering computers, etc.), the known characteristics of the hardware, etc. In some embodiments, the exact same calculations can be repeated to track the frequency movement through time. If large changes are detected, processing can include adaptively selecting another block of L in between the two that have already been chosen to make sure that nothing is missed. Similarly, if almost no change is detected, then the next block of L can be spaced out further, for example, by increasing or decreasing the spacing by a factor of two and starting out with (for example) a 1 second spacing.

Removing Undesirable Frequencies from the Received Signal

Figure 5:
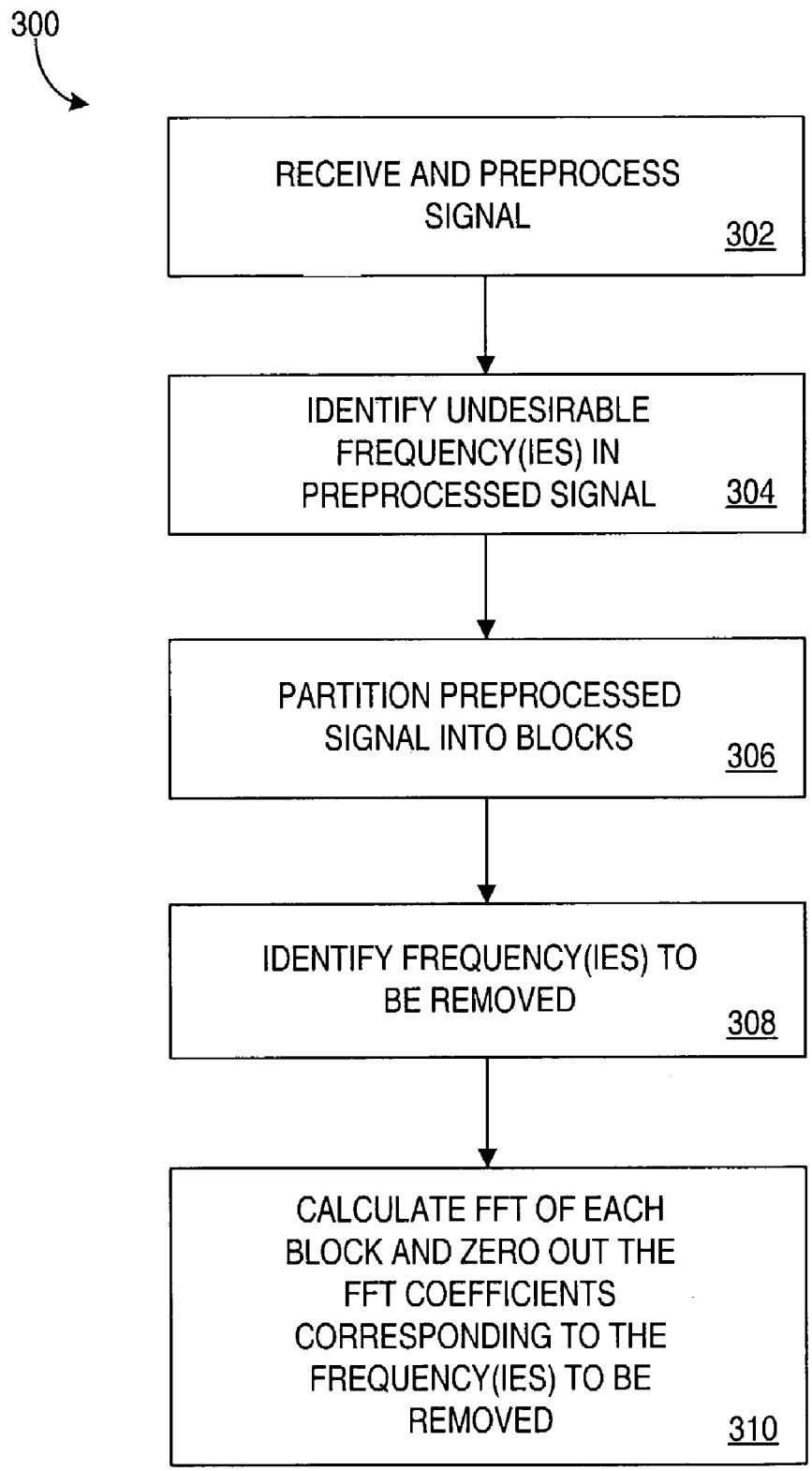
FIG. 5 is a flow chart of a noise mitigation method according to some embodiments of the present invention.

Referring now to FIG. 5, a flow chart is depicted illustrating a process 300 for removing undesirable frequencies from a signal. In some embodiments, process 300 is performed to remove frequencies corrupted by narrowband noise in a location-determining signal, such as a GPS navigation signal.

Processing begins at 302 where a signal is received by receiver 14. In some embodiments, the signal is a location-determining signal (such as the signal $x_k$ described above in conjunction with FIG. 4). Processing at 302 may also include preprocessing the signal to generate a preprocessed signal (such as the signal $y_k$ described above in conjunction with FIG. 4). Again, the nature of preprocessing performed at 302 may depend, for example, on the nature of the signal received and the application for which the signal is to be used. In some embodiments, preprocessing may be unnecessary; instead, processing may continue using the sampled signal $x_k$. For the purposes of describing process 300, the use of a preprocessed signal $y_k$ will be assumed.

Processing continues at 304 where undesirable frequencies in the preprocessed signal $y_k$ are identified. In some embodiments, processing at 304 includes the processing described above in conjunction with FIG. 4. In some embodiments, processing at 304 utilizes other techniques to identify undesirable frequencies in the preprocessed signal (e.g., those frequencies containing undesirable amounts of narrowband noise).

For example, the device may remember some undesirable frequencies from previous runs, other nearby devices could report their experience with undesirable frequencies to this device, or the undesirable frequencies might have been carried over from identifications done in other segments of sampled data.

In some embodiments (e.g., where identification techniques such as those described above in conjunction with FIG. 4 are used), processing at 304 results in the identification of a set F of frequencies at which it is suspected that the narrowband noise has significant power. The frequencies in the set F are integer multiples of a fundamental frequency 1/L (where L is the block length selected as described above in conjunction with FIG. 4) or are a combination of integer multiples of 1/L and other arbitrary frequencies deemed undesirable.

Processing continues at 306 where the preprocessed signal $y_k$ is partitioned into blocks of some length M. In some embodiments, the block length M is selected to be equal to the block length L used in identifying undesirable frequencies (e.g., as described in conjunction with FIG. 4, above). In some embodiments, the block length M is selected to be different than the length L. The selection of the block length M may be made based on several considerations. For example, when the length is large, the computational requirements are greater; when the length is small, the achievable frequency resolution is limited. In a GPS environment, where a GPS navigation signal is sampled at 4 Megahertz, Applicants have found that the block length M can be taken as small as approximately 1,024 (e.g., blocks of duration of approximately 0.25 millisecond). Those skilled in the art will realize that other block lengths may be used, based, for example, on a particular system's ability to process long signal blocks and based on a desired frequency resolution. In some embodiments where the FFT of signal blocks of a particular length are already available, it might be desirable to choose the block length M so as to reuse the available FFT calculations.

Determining the Frequencies to be Removed

Processing continues at 308 where frequency(ies) to be removed are identified. According to some embodiments, processing at 308 includes constructing a set F' of frequencies that are integer multiples of 1/M, and which are to be removed from the preprocessed signal generated at 302. In some embodiments, later steps of process 300 involve the creation of FFTs of data blocks having a block length M, therefore, the frequencies are manipulated as integer multiples of 1/M. However, processing at 304 identified a set F of undesirable frequencies in the preprocessed signal which are integer multiples of 1/L. According to some embodiments of the present invention, the elements of set F of undesirable frequencies in the preprocessed signal are approximated by new frequencies that are integer multiples of 1/M.

In some embodiments, processing at 308 includes the construction of a set F' by selecting, for each frequency in the set of undesirable frequencies, the nearest integer multiples of 1/M. These frequencies are designated as the set of frequencies to be removed. For example, in some embodiments, this set of frequencies to be removed is selected by finding, for each frequency f∈F, i such that $$\frac{i}{M} \le f \le \frac{i+1}{M}, \tag{6}$$

and include in the set F' the frequencies i/M, (i+1)/M.

In some embodiments, processing at 308 includes selecting a larger set of frequencies to be removed. For example, in one embodiment, processing at 308 includes selecting the neighboring frequencies of frequencies in the set F of undesirable frequencies. For example, an integer parameter ω is chosen which is related to the width of a desired neighborhood of frequencies. The set of frequencies to be removed (F') is then selected to consist of all integer multiples of 1/M that are within ω/M from a frequency in the set of undesirable frequencies.

In some embodiments, processing at 308 includes selecting an integer parameter ω in an adaptive manner, e.g., as a function of the narrowband noise power. For example, for a frequency in the set F with a large amount of narrowband power, a large parameter ω is selected. For a frequency in the set F which has a small amount of narrowband power, a smaller parameter ω is selected. Applicants believe that this approach allows the removal of narrowband noise which has "spilled over" into neighboring frequencies when the frequency resolution is changed from 1/L to 1/M. The magnitude of this "spill over" effect can be modeled in terms of the sinc function, where sinc(t)=sin t/t.

In some sinc-based embodiments, processing at 308 includes calculating a coefficient Ψ(f') for each frequency f' which is an integer multiple of 1/M. The coefficient is calculated using formula (7):

$$\Psi(f') = \sum_{f \in F} G(f)\text{sinc}^2(M\pi(f' - f)). \tag{7}$$

After calculating the coefficient, the set F' is established as containing all integer multiples of 1/M for which the coefficient Ψ(f') exceeds a certain threshold t'. For example, the threshold t' can be chosen to be the same, or close to the threshold which was selected for use in identifying narrowband noise (see step 212 of FIG. 4).

Furthermore, the sum above need not be calculated exactly. Since sinc^2 is a decreasing function, it can often be approximated using only the frequencies that are in a neighborhood around f' since those that are far away will likely contribute very little to the sum. This is particularly useful when there are many frequencies in F. The size of the neighborhood can either be chosen in advance, or chosen adaptively based on the value distribution for G(f) that are encountered.

In a further embodiment of sinc-based processing at 308, the formula used to calculate the coefficient Ψ(f') is replaced with formula (8):

$$\Psi(f') = \max_{i=1,0,1} \Psi_i(f') \text{ where} \tag{8}$$

$$\Psi_i(f') = \sum_{f \in F} G(f)\text{sinc}^2(M\pi(f' - f + (i/L))).$$

Once a set of frequencies to be removed has been identified (using, for example, any of the various techniques described in conjunction with item 308 or other techniques known in the art), processing continues at 310 where a FFT of each block is calculated and the FFT coefficients corresponding to the frequencies to be removed are zeroed out or otherwise removed from the preprocessed signal. In some embodiments for each of the blocks of length M, FFT coefficients are calculated for frequencies f that are integer multiples of 1/M. For example, those skilled in the art will appreciate that a formula such as Formula 9 may be used to define these coefficients. A number of different calculations may be utilized to calculate each of the values.

$$\sum_{k=1}^{L} y_k e^{-2\pi j f_{1F} k} e^{-2\pi j f k} \tag{9}$$

For every frequency in the set of frequencies to be removed, the corresponding FFT coefficients are set to zero. The FFT coefficients for frequencies outside the set of frequencies to be removed are not modified. The resulting FFT coefficients correspond to a modified signal $z_k$ (where $z_k$ is related to the preprocessed signal $y_k$ except that the frequency components identified above have been removed, presumably taking most of the narrowband noise with them out of the signal). This modified signal can now be used for normal processing by receiver 14. In some embodiments, receiver 14 may directly use the FFT coefficients of the modified signal. In some embodiments, for example where an application utilizes data in the time domain, an inverse FFT may be used to construct a time domain representation of the modified signal $z_k$. In either event, the result is the use of a signal from which undesirable frequencies have been removed. If the noise is not sufficiently stationary, then the undesirable frequencies can either all be combined for a combined removal, or the removal can proceed using different frequencies on different blocks according to the local stationarity properties. If the amount of noise energy eliminated in the blocks is substantially different, than this needs to be passed along to the detection threshold calculations so that they can be adjusted accordingly since the average noise energy will not be constant throughout the sample.

In some embodiments, processing of one or more steps of process 300 is performed at receiver 14. In some embodiments, processing of one or more steps of process 300 is performed at server 60. In some embodiments, processing of one or more steps of process 300 may be performed by one or more of receiver 14 and server 60.

Removing Frequencies in the Reference Signal

Referring now to FIG. 3, a flowchart is shown depicting a process 400 for removing undesirable frequencies from reference signals. According to some embodiments of the present invention, signals received by receiver 14 are intended to be correlated with one or more reference signals. For example, in a GPS environment, GPS signals are correlated with reference signals. Some other location-determining systems also involve correlating the received signal $x_k$ (or the preprocessed received signal $y_k$) with various time-shifts of frequency-modulated versions of reference signals $r_k^i$. This correlation calculation can be carried out in the time-domain, in which case it amounts to a convolution calculation, or in the frequency domain by multiplying the Fourier transforms of $y_k$ and of the reference signal $r_k^i$. If $\Im$ is a linear time-invariant filter that corresponds to removing (or notching) of certain frequencies, and if * denotes convolution, those skilled in the art understand that $(\Im y)*r^i = y*(\Im r^i)$. That is, the desired effect of removing certain frequencies can be accomplished by either removing those frequencies from the preprocessed signal $y_k$, or it can be accomplished by removing those frequencies from the reference signal $r_k^i$.

In some applications, the reference signal has a periodic structure. In such cases, mitigation of narrowband noise can be obtained by operating solely on a single period of the reference signal. Those skilled in the art will appreciate that this provides potentially significant computational savings over other approaches that may require removal of narrowband noise from the entire preprocessed signal.

Figure 6:
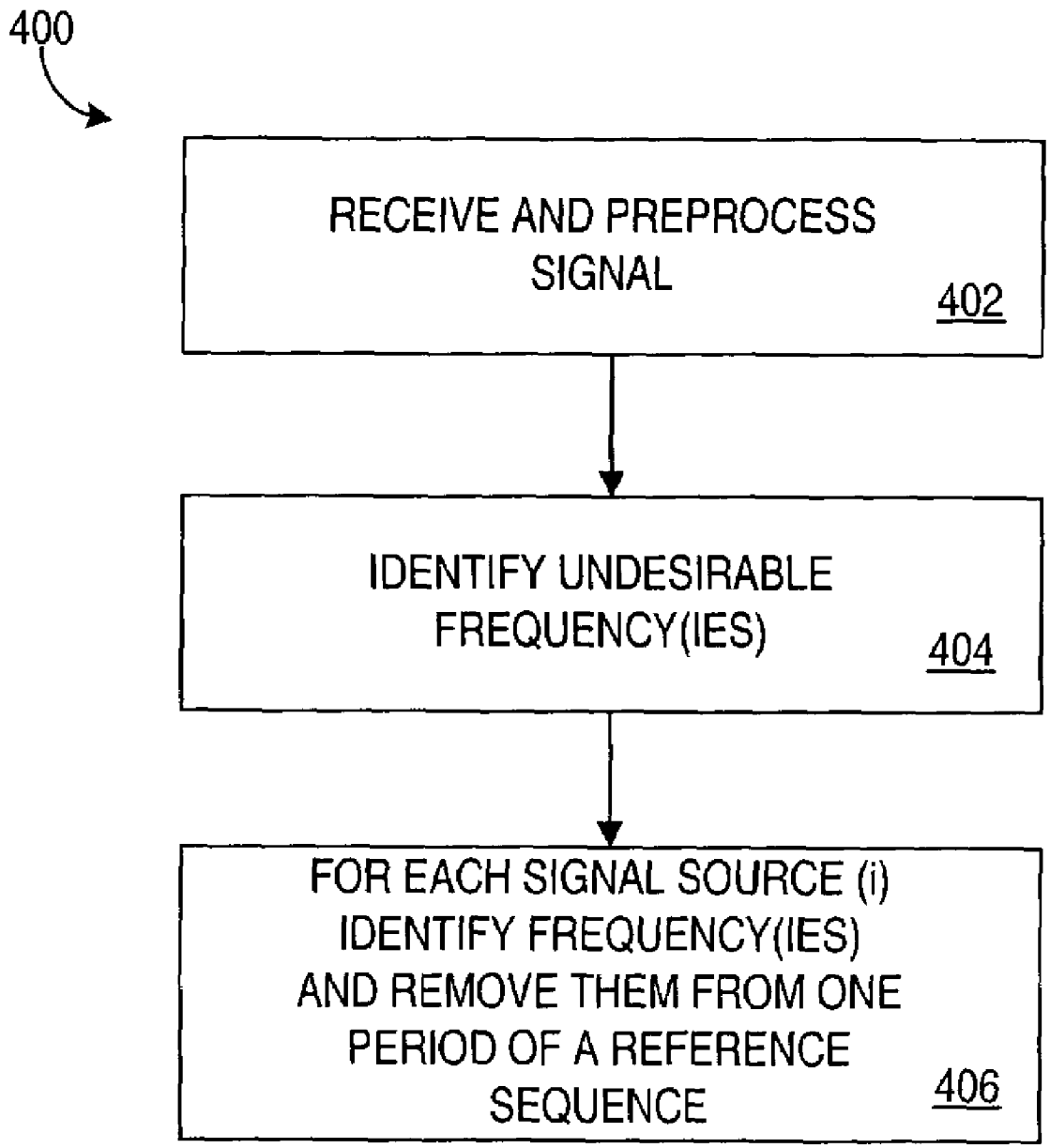
FIG. 6 is a flow chart of a further noise mitigation method according to some embodiments of the present invention.

One embodiment of the present invention that mitigates the effects of narrowband noise by removing narrowband noise from a reference signal will now be described by referring to FIG. 6. Processing begins at 402 where a signal is received and preprocessed. Processing at 402 may be similar to processing at 302 of FIG. 5. In one embodiment where the signal received and preprocessed is a GPS signal, a reference signal is also received. The reference signal has the form:

$$r_k^i = p_k^i v_k^i \quad (10)$$

The components of the reference signal include $p_k^i$ which is a periodic reference sequence and $v_k^i$ which is a modulating binary sequence taking values in the set $\{-1, 1\}$ and which stays constant during each period of the periodic reference signal $p_k^i$. More particularly, in the GPS environment, the periodic reference signal is a periodic pseudorandom (PRN) sequence with a period of 1 millisecond. The modulating binary sequence $v_k^i$ is a navigation information sequence that can change only at 20 millisecond intervals. Applicants have discovered that filtering narrowband noise from frequencies in the PRN signal produces desirable results. In particular, Applicants have discovered that the following approximate equality holds approximately:

$$\Im(p_k^i v_k^i) = (\Im p_k^i) v_k^i, \text{ where } \Im \text{ is a filter that corresponds to removing certain frequencies.} \quad (11)$$

Further, since the reference sequence $p_k^i$ is periodic, the mitigated signal $\Im p_k^i$ can be determined by processing a single period of the reference sequence. The result is an ability to remove undesirable frequencies in a manner that uses fewer computational resources.

Once the signals have been received and preprocessed at 402, processing continues at 404 where undesirable frequency(ies) are identified. In some embodiments, processing at 404 utilizes techniques described and discussed above in conjunction with FIG. 4 (e.g., the processing at 308 where a set F of undesirable frequencies is identified, each of which is an integer multiple of a fundamental frequency 1/L as determined by a selected length L of signal data blocks). Once a set of undesirable frequencies is identified, processing continues to 406 where, for each signal source i, undesirable frequency(ies) are identified and removed from one period of a reference sequence. By identifying and removing undesirable frequencies from reference signals, processing demands are decreased, allowing effective noise mitigation in algorithms that process location determining signals.

Specific Methods to Remove Frequencies from Reference Signal

Figure 7:
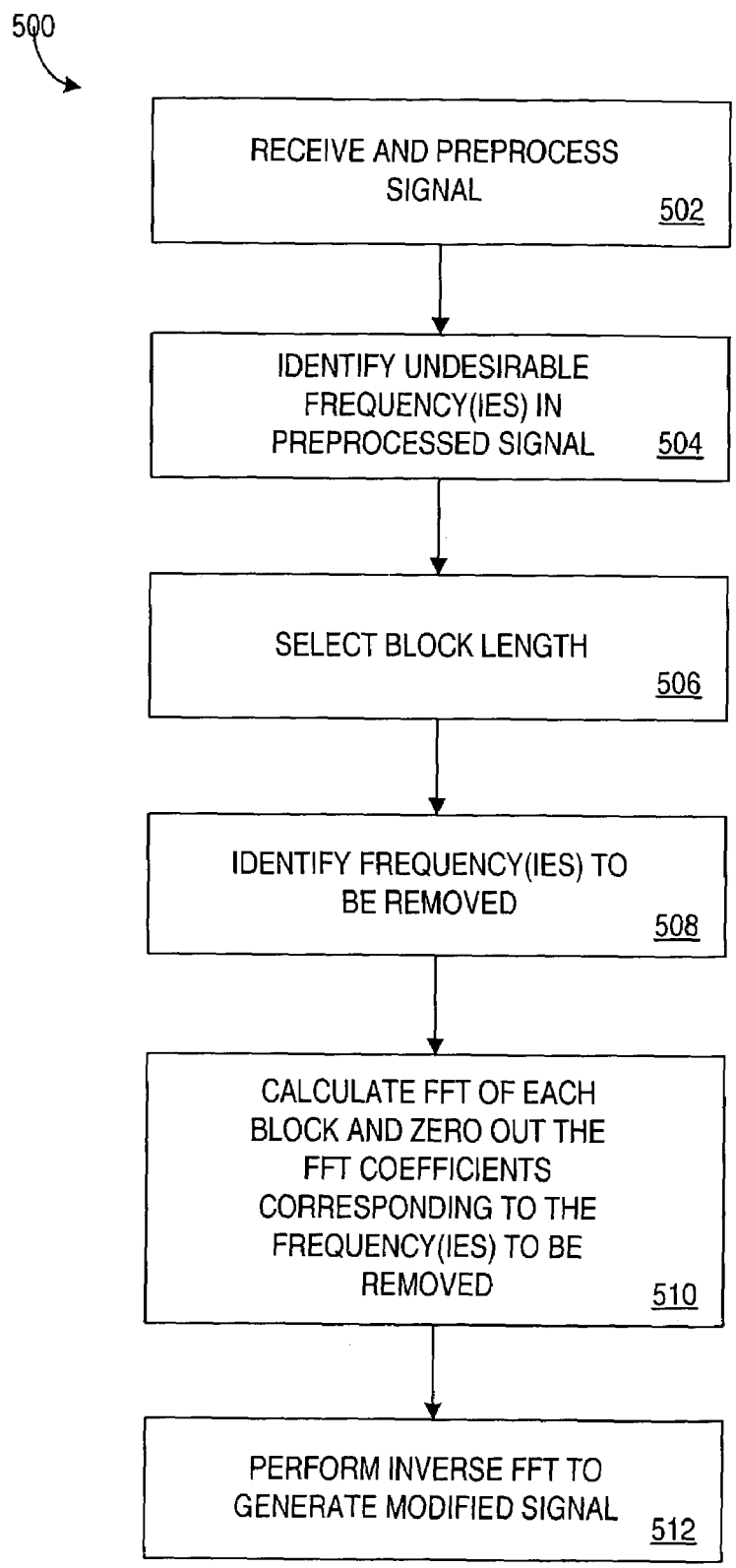
FIG. 7 is a flow chart of a further noise removal method according to some embodiments of the present invention.

Further details of one embodiment of a technique for identifying and removing undesirable frequencies from reference signals will now be described in detail by reference to process 500 of FIG. 7. Process 500 may be repeated for each reference signal. Process 500 begins at 502 where one or more signals are received and preprocessed (e.g., as described above in conjunction with FIGS. 4–6).

Processing continues at 504 where undesirable frequencies in the preprocessed signal are identified. This processing may be performed as described above in conjunction with FIGS. 4–6 to identify a set F of undesirable frequencies. Processing continues at 506 where a block length is selected. In the embodiment depicted in FIG. 7, the block length is selected to be the same as the number of samples in a single period of the reference signal $p_k^i$. That is, M is the number of samples in one such period. In some embodiments, M may be some fraction of the period.

Processing continues at 508 where a frequency(ies) to be removed are identified (e.g., a set of frequencies $F'_i$ is determined which includes those frequencies that are integer multiples of 1/M and which are to be removed from the M-length reference sequence $p_k^i$. Processing at 508 may be performed in a number of different ways. For example, for every frequency that has been identified as corrupted by narrowband noise in the received signal, a corresponding frequency has to be determined in the reference signal, while taking into account known frequency shifts, such as Doppler shifts and in some embodiments, the uncertainty in the Doppler shifts. In some cases, the same reference signal might be used in the context of many different Doppler shifts. This can occur when the frequency uncertainty is divided into more manageable chunks of hypothesized uncertainty. Another way in which different Doppler shifts and uncertainties can arise in a given run of a location determining algorithm, is when the uncertainty starts out large but then gets smaller as signals are acquired. When this happens, in general not only will the uncertainty get smaller but the nominal value for the Doppler shift will also change to more accurate values. In a GPS embodiment, processing at 504 identifies a set F of frequencies at which the baseband version (e.g., formula (12)) of the received signal contains undesirable noise.

$$y_k e^{-2\pi i f_1 F k} \tag{12}$$

This baseband signal is frequency-shifted by an amount equal to the known Doppler shift $f^i$ before it is correlated with the reference signal. This frequency shift has the effect of moving an undesirable frequency $f \in F$ to an nearby undesirable frequency $f-f^i$. Thus, the frequencies to be removed from the reference signal $p_k^i$ at step 508 are of the form: $f-f^i$, $f \in F$. As a result, processing at 508 includes constructing a set $F_i$ of shifted frequencies. Because the elements of the set of shifted undesirable frequencies $F_i$ are not necessarily integer multiples of $1/M$, they may be modified by forming an approximating set $F'_i$. In one embodiment of the present invention, the approximating set $F'_i$ is formed by letting the set be the set of all integer multiples of $1/M$ that are within $1/M$ from an element of $F_i$. This set of frequencies is the set of frequencies to be removed from the reference signal $p_k^i$.

Processing at 508 may be performed in other manners as well. For example, the methods and alternatives described in conjunction with FIG. 5 above may be used (e.g., such as the sinc-based method described above at step 308 of the process of FIG. 5). The methods described herein ignore unknown frequency shifts in the received signal (e.g., designated as $f_0^i$). Standard methods for dealing with such unknown frequency shifts include hypothesizing various values for $f_0^i$ and frequency-shifting the received signal by an amount equal to the hypothesized value before carrying out any convolution or correlation calculations. In some embodiments, Applicants believe that the terms $f_0^i$ may be ignored in the mitigation of narrowband noise, so long as $f_0^i$ is small relative to the frequency resolution $1/M$. For example, in the context of GPS, and with 1 millisecond PRN sequences, the frequency resolution $1/M$ corresponds to 1 Kilohertz, whereas the residual uncertainty in the modulation frequency is typically of the order of approximately 500 Hertz or less.

Processing continues at 510 where the FFT of each block of the reference sequence is calculated and the FFT coefficients corresponding to the frequency(ies) to be removed are zeroed out. The removal or zeroing out of frequencies may occur a number of times for each frequency identified at 508. Calculation of the FFT of an M-length period of the reference sequence $p_k^i$ results in the generation of FFT coefficients $P^i(f)$ for frequencies that are integer multiples of $1/M$. Pursuant to some embodiments, processing at 510 also includes modifying the FFT coefficients $P^i(f)$ by setting $P^i(f)$ to zero for every frequency in the set of undesirable frequencies identified at 504. Those coefficients corresponding to frequencies not included in the set of undesirable frequencies are left unchanged.

The zeroing out of FFT coefficients requires a renormalization of the reference signal, as those skilled in the art easily recognize. Rather than renormalizing the reference signal, it may be more computationally efficient to scale the thresholds which the correlation are compared to.

According to some embodiments, processing continues at 512 where an inverse FFT is performed on the FFT coefficients modified by 510 (i.e., with the coefficients corresponding to frequencies to be removed or zeroed out) to generate a modified reference sequence $\hat{p}_k^i$ from which the frequencies identified at 508 have been removed. This modified reference sequence may be used in conjunction with location determining signals as reference signals known in the art are used. Embodiments of the present invention allow the mitigation of narrowband noise in the processing of location-determining signals.

If the noise is not sufficiently stationary, then modifications to the algorithm similar to those in the previous sections can be adopted. The present invention has been described in terms of several embodiments solely for the purpose of illustration. Embodiments of the present invention may be implemented using methods, apparatus, systems, computer program code and other means. Persons skilled in the art will recognize from this description that the invention is not limited to the embodiments described, but may be practiced with modifications and alterations limited only by the spirit and scope of the appended claims.

What is claimed is:

1. A method for removing the effects of narrowband noise from a location-determining signal associated with a reference signal, the method comprising:

identifying a set of noisy frequencies in said location-determining signal, the noisy frequencies being identified by (a) performing a fourier transform on each of a plurality of blocks of the location determining signal, (b) combining magnitudes of coefficients of the fourier transforms of corresponding frequencies; and (c) selecting the noisy frequencies according to the combined magnitudes and a threshold that takes into account a loss of signal strength associated with the reference signal that would result if the noisy frequencies are removed from the location-determining signal;

determining a set of frequencies to be removed associated with said set of noisy frequencies; and removing said set of frequencies from said location-determining signal, thereby removing the effects of narrowband noise from said location-determining signal.

2. The method of claim 1, wherein said removing comprises calculating a fast fourier transform (FFT) of a length M block of said reference signal, to yield a plurality of FFT coefficients each associated with a frequency which is a multiple of $1/M$.

3. The method of claim 2, wherein said removing comprises zeroing out said FFT coefficients corresponding to said set of frequencies to be removed.

4. The method of claim 2, comprising performing an inverse FFT calculation to generated a modified reference signal.

5. The method of claim 1, wherein each block of the location determining signal comprises a length L block of said location-determining signal; and wherein performing each fourier transform comprises calculating a fast fourier transform (FFT) of said length L block, to yield a plurality of identification FFT coefficients.

6. The method of claim 1, wherein:

performing each fourier transform comprises calculating a fast fourier transform (FFT) of each of said blocks, to yield a plurality of identification FFT coefficients for each of said blocks;

combining coefficients comprises summing the magnitudes of the identification FFT coefficients of said blocks to generated a plurality of combined magnitudes; and selecting comprises comparing said combined magnitudes to a said threshold to identify said noisy frequencies.

7. A method for removing the effects of narrowband noise from a location determining signal associated with a reference signal, the method comprising:

selecting a plurality of blocks of said location-determining signal each having a length L;

calculating a fast fourier transform (FFT) of each of said length L blocks, to yield a plurality of identification FFT coefficients for each block;

combining the identification FFT coefficients of corresponding frequencies;

comparing the magnitudes of said combined identification FFT coefficients to a threshold to identify a set of noisy frequencies at which said location-determining signal has narrowband noise, said threshold taking into account a loss of signal strength associated with said reference signal that would result if said noisy frequencies are removed from the location-determining signal;

determining a set of frequencies to be removed associated with said set of noisy frequencies;

calculating a fast fourier transform of a length M block of said reference signal, to yield a plurality of reference signal FFT coefficients each associated with a frequency which is a multiple of 1/M; and decreasing said reference signal FFT coefficients that correspond to said set of frequencies to be removed, thereby removing the effects of narrowband noise from said location-determining signal.

8. A method for removing the effects of narrowband noise from a location-determining signal associated with a reference signal, the method comprising:

selecting a plurality of blocks of said location-determining signal;

calculating a fast fourier transform (FFT) of each of said blocks, to yield a plurality of identification FFT coefficients;

combining the magnitudes of the identification FFT coefficients of said blocks to generated a plurality of combined magnitudes;

comparing said combined magnitudes to a threshold to identify a set of noisy frequencies at which said location-determining signal has narrowband noise, said threshold taking into account a loss of signal strength associated with said reference signal that would result if said noisy frequencies are removed from the location-determining signal;

determining a set of frequencies to be removed associated with said set of noisy frequencies;

calculating a fast fourier transform of a length M block of said reference signal, to yield a plurality of reference signal FFT coefficients each associated with a frequency which is a multiple of 1/M; and decreasing said reference signal FFT coefficients that correspond to said set of frequencies to be removed, thereby removing the effects of narrowband noise from said location-determining signal.

9. The method of claim 2, wherein said determining said set of frequencies to be removed comprises identifying frequency intervals delimited by consecutive multiples of 1/M and containing one of said noisy frequencies.

10. The method of claim 7, wherein said determining said set of frequencies to be removed comprises identifying frequency intervals delimited by consecutive multiples of 1/M and containing one of said noisy frequencies.

11. The method of claim 5, wherein said removing comprises calculating a fast fourier transform (FFT) of a length M block of said reference signal, to yield a plurality of reference signal FFT coefficients each associated with a frequency which is a multiple of 1/M; and said determining said set of frequencies to be removed comprises interpolating said identification FFT coefficients at a plurality of frequencies that are multiples of 1/M.

12. The method of claim 7, wherein said determining said set of frequencies to be removed comprises interpolating said identification FFT coefficients at a plurality of frequencies that are multiples of 1/M.

13. The method of claim 8, wherein said determining said set of frequencies to be removed comprises interpolating said identification FTT coefficients at a plurality of frequencies that are multiples of 1/M.

14. A receiver, comprising:

a processor;

a communication device, receiving a location-determining signal; and a storage device in communication with said processor and storing instructions adapted to be executed by said processor to identify a set of noisy frequencies in said location-determining signal, determine a set of frequencies to be removed associated with said set of noisy frequencies; and to remove said set of frequencies to be removed from a plurality of reference signals associated with said location-determining signal, thereby removing the effects of narrowband noise from said location-determining signal; wherein the noisy frequencies are identified by (a) performing a fourier transform on each of a plurality of blocks of the location determining signal, (b) combining magnitudes of coefficients of the fourier transforms of corresponding frequencies; and (c) selecting the noisy frequencies according to the combined magnitudes and a threshold that takes into account a loss of signal strength associated with said reference signal that would result if the noisy frequencies are removed from the location-determining signal.

15. a computer-readable medium storing instructions adapted to be executed by a processor to mitigate the effects of narrowband noise in a location-determining signal associated with a plurality of reference signals, reference signals comprising:

instructions for identifying a set of noisy frequencies in said location-determining signal, the noisy frequencies being identified by (a) performing a fourier transform on each of a plurality of blocks of the location determining signal, (b) combining magnitudes of coefficients of the fourier transforms of corresponding frequencies; and (c) selecting the noisy frequencies according to the combined magnitudes and a threshold that takes into account a loss of signal strength associated with said reference signal that would result if the noisy frequencies are removed from the location-determining signal;

instructions for determining a set of frequencies to be removed associated with said set of noisy frequencies; and instructions for removing said set of frequencies to be removed from said location-determining signal, thereby removing the effects of narrowband noise from said location-determining signal.

16. A method for removing noise from a sampled signal, comprising:
    identifying an undesirable frequency in said sampled signal, wherein said undesirable frequency is associated with narrowband noise, the noisy frequencies being identified by (a) performing a fourier transform on each of a plurality of blocks of the location determining signal, (b) combining magnitudes of coefficients of the fourier transforms of corresponding frequencies; and (c) selecting the noisy frequencies according to the combined magnitudes and a threshold that takes into account a loss of signal strength associated with a reference signal that would result if the noisy frequencies are removed from the location-determining signal;
    partitioning said sampled signal into a plurality of M length blocks, each of said M length blocks having a length M;
    identifying a frequency to be removed from said sampled signal;
    calculating a fast fourier transform (FFT) for each of said M length blocks, to yield a plurality of FFT coefficients; and
    zeroing out, for each of said M length blocks, said FFT coefficients corresponding to said frequency to be removed.

17. The method of claim 16, wherein said sampled signal is a preprocessed signal, the method further comprising:
    receiving a location-determining signal; and
    preprocessing said location-determining signal to generate said sampled signal.

18. The method of claim 16, wherein each of said fourier transform is performed by a fast fourier transform (FFT).

19. The method of claim 18, wherein said length L is selected to be small in comparison to an overall duration of said sampled signal.

20. The method of claim 18, wherein said length M is selected to be less than said length L.

21. The method of claim 18, wherein said length M is selected to be equal to said length L.

22. The method of claim 16, wherein said frequency to be removed is equal to said undesirable frequency.

23. The method of claim 16, wherein said frequency to be removed is a plurality of frequencies including at least said undesirable frequency and two adjacent frequencies of said undesirable frequency.

24. The method of claim 16, wherein said frequency to be removed is a plurality of frequencies including at least two adjacent frequencies of said undesirable frequency.

25. The method of claim 16, wherein said frequency to be removed is a plurality of frequencies including at least said undesirable frequency and a plurality of adjacent frequencies of said undesirable frequency.

26. The method of claim 25, wherein the number of said plurality of adjacent frequencies is determined based on the power of narrowband noise in said sampled signal near said undesirable frequency.

27. The method of claim 16, wherein said sampled signal is a location-determining signal received by a receiving device, said receiving device in communication with a server, wherein at least one of said steps of said method is performed at said server.

28. The method of claim 16, wherein said sampled signal is a global positioning system (GPS) location-determining signal.

29. A method for removing narrowband noise from a location-determining signal, comprising:
    identifying a first set of frequencies in said signal, wherein each frequency of said first set is associated with narrowband noise, the first set of frequencies being identified by (a) performing a fourier transform on each of a plurality of blocks of the location determining signal, (b) combining magnitudes of coefficients of the fourier transforms of corresponding frequencies; and (c) selecting the first set of frequencies according to the combined magnitudes and a threshold that takes into account a loss of signal strength associated with a reference signal that would result if the first set of frequencies are removed from the location-determining signal;
    partitioning said signal into a plurality of M length blocks, each of said M length blocks having a length M;
    identifying a second set of frequencies to be removed from said signal, said second set based on said first set of frequencies;
    calculating a fast fourier transform (FFT) for each of said M length blocks, to yield a plurality of FFT coefficients; and
    removing, for each of said M length blocks, said FFT coefficients corresponding to a frequency in said second set of frequencies.

30. The method of claim 29, wherein each fourier transform is calculated using a fast fourier transform (FFT).

31. The method of claim 30, wherein-each of the plurality of blocks is selected to be short as compared to an overall duration of said signal.

32. The method of claim 30, wherein said length M is selected to be less than said length L.

33. The method of claim 30, wherein said length M is selected to be equal to said length L.

34. The method of claim 29, wherein said second set of frequencies includes frequencies of said first set.

35. The method of claim 29, wherein said second set of frequencies includes frequencies of said first set and frequencies adjacent to each frequency in said first set.

36. The method of claim 29, wherein said second set of frequencies includes frequencies of said first set and a plurality of nearby frequencies, said nearby frequencies including frequencies near each frequency in said first set.

37. The method of claim 36, wherein the number of said plurality of nearby frequencies for each frequency in said first set is determined based on the power of narrowband noise in said signal near each frequency of said first set.

38. A receiver, comprising:
    a processor; and
    a storage device in communication with said processor and storing instructions adapted to be executed by said processor to:
        identify an undesirable frequency in a signal, wherein said undesirable frequency is associated with narrowband noise, the undesirable frequency being identified by (a) performing a fourier transform on each of a plurality of blocks of the location determining signal, (b) combining magnitudes of coefficients of the fourier transforms of corresponding frequencies; and (c) selecting the undesirable frequency according to the combined magnitudes and a threshold that takes into account a loss of signal strength associated with a reference signal that would result if the undesirable frequency is removed from the location-determining signal;

partition said signal into a plurality of blocks, each of said blocks having a length M;

identify a frequency to be removed from said signal;

calculate a fast fourier transform (FFT) for each of said blocks, said FFT of each of said blocks having a plurality of coefficients; and zero out, for each of said blocks, said coefficients corresponding to said frequency to be removed.

39. The receiver of claim 38, further comprising a communications device coupled to said processor and receiving said signal.

40. The receiver of claim 38, wherein said processor includes a microprocessor and a signal processing device.

41. a computer-readable medium storing instructions adapted to be executed by a processor to mitigate the effects of narrowband noise in a location-determining signal, comprising:

instructions for identifying an undesirable frequency in said signal, wherein said undesirable frequency is associated with narrowband noise, the undesirable frequency being identified by (a) performing a fourier transform on each of a plurality of blocks of the location determining signal, (b) combining magnitudes of coefficients of the fourier transforms of corresponding frequencies; and (c) selecting the undesirable frequency according to the combined magnitudes and a threshold that takes into account a loss of signal strength associated with said reference signal that would result if the undesirable frequency is removed from the location-determining signal;

instructions for partitioning said signal into a plurality of blocks, each of said blocks having a length M;

instructions for identifying a frequency to be removed from said signal;

instructions for calculating a fast fourier transform (FFT) for each of said blocks, said FFT of each of said blocks having a plurality of coefficients; and instructions for zeroing out, for each of said blocks, said coefficients corresponding to said frequency to be removed.

42. A method of identifying narrowband noise in a location-determining signal, comprising:

receiving a location-determining signal;

pre-processing said location-determining signal to generate a signal;

selecting a plurality of blocks of said signal;

calculating a fast fourier transform (FFT) of each of said blocks, to yield a plurality of coefficients each having a magnitude;

creating a plurality of combined magnitudes from said magnitudes; and comparing said combined magnitudes to a threshold to identify narrowband noise in said signal, said threshold taking into account a loss of signal strength associated with a reference signal that would result if the narrow band noise is removed from the location-determining signal.

43. The method of claim 42, wherein said location-determining signal is a global positioning system (GPS) signal.

44. The method of claim 42, wherein said blocks are non-contiguous and dispersed within said signal.

45. The method of claim 42, wherein said blocks are contiguous and dispersed within said signal.

46. The method of claim 45, wherein creating said combined magnitudes comprises:

squaring said magnitudes; and adding said squared magnitudes to generate said combined magnitudes.

47. The method of claim 45, wherein creating said combined magnitudes comprises adding said magnitudes to generate said combined magnitudes.

48. The method of claim 42, wherein said threshold is selected to maintain a desired level of signal energy in said signal.

49. The method of claim 42, wherein said threshold is selected based on a length of said signal.

50. The method of claim 42, wherein said threshold is selected based on a combined length of said plurality of selected blocks.

51. The method of claim 42, wherein one or more of the steps of the method are performed by a server.

52. The method of claim 42, wherein one or more of the steps of the method are performed by a receiver device.

53. A method for identifying narrowband noise in a signal, comprising:

receiving a signal;

selecting a plurality of blocks of said signal, each having a length that is small in comparison to an overall duration of said signal;

calculating a fast Fourier transform (FFT') of each of said blocks, said FFT of each of said blocks having a plurality of coefficients each having a magnitude;

generating a plurality of combined magnitudes using said magnitudes; and comparing said combined magnitudes to a threshold to identify narrowband noise in said signal, said threshold taking into account a loss of signal strength associated with a reference signal that would result if the narrowband noise is removed from the location-determining signal.

54. The method of claim 53, wherein said generating a combined squaring said magnitudes; and adding said squared magnitudes to generate said combined magnitudes.

55. The method of claim 53, wherein said generating a combined magnitude comprises: adding said magnitudes to generate said combined magnitudes.

56. The method of claim 54, wherein said signal is a location-determining signal received by a receiver device, said receiver device in remote communication with a server, wherein at least one of said receiving, selecting, calculating, generating and comparing is performed by said server.

57. The method of claim 53, wherein said signal is a location-determining signal received by a receiver device, wherein said receiving, selecting, calculating, generating and comparing are performed by said receiver device.

58. A method for identifying narrowband noise in a location-determining signal, comprising:

receiving said location-determining signal;

preprocessing said location-determining signal to generate a preprocessed signal;

selecting a plurality of blocks of said preprocessed signal;

calculating, for each of said plurality of blocks, a plurality of fast Fourier transform (FFT) coefficients, wherein each of said coefficients is at a different frequency, and each of said coefficients having a magnitude;

combining the magnitudes of said coefficients to generate a plurality of combined magnitudes; and identifying those frequencies for which said combined magnitudes exceed a threshold, said threshold taking into account a loss of signal strength associated with a reference signal that would result if those frequencies are removed from the location-determining signal.

59. A receiver, comprising:
a processor;
a communication device coupled to said processor and receiving a location-determining signal; and
a storage device in communication with said processor and storing instructions adapted to be executed by said processor to:
preprocess said location-determining signal to generate a preprocessed signal; select a plurality of blocks of said preprocessed signal;
calculate a fast fourier transform (FFT) of each of said blocks, said FFT of each of said blocks having a plurality of coefficients; and
calculate combined magnitudes from the magnitudes of said coefficients; and
compare said combined magnitudes to a threshold to identify narrowband noise of said signal, said threshold taking into account a loss of signal strength associated with a reference signal that would result if the narrowband noise is removed from the location-determining signal.

60. a computer-readable medium storing instructions adapted to be executed by a processor to identify narrowband noise in a location-determining signal, comprising:
instructions for selecting a plurality of blocks of said signal;
instructions for calculating a fast fourier transform (FFT) of each of said blocks, said FFT of each of said blocks having a plurality of coefficients;
instructions for calculating combined magnitudes from the magnitudes of said coefficients; and
instructions for comparing said combined magnitudes to a threshold to identify narrowband noise of said signal, said threshold taking into account a loss of signal strength associated with a reference signal that would result if the narrowband noise is removed from the location-determining signal.

61. A method for removing narrowband noise from a received signal of a location determining system, the received signal having embedded therein a reference signal, the method comprising:
selecting portions of the received signal;
using the selected portions of the received signal to identify a set of noise frequencies with energy contributed to the received signal by the narrowband noise signal, the noisy frequencies being identified by (a) performing a fourier transform on each of a plurality of blocks of the location determining signal, (b) combining magnitudes of coefficients of the fourier transforms of corresponding frequencies; and (c) selecting the noisy frequencies according to the combined magnitudes and a threshold that takes into account a loss of signal strength associated with said reference signal that would result if the noisy frequencies are removed from the location-determining signal;

modifying a copy of said reference signal by diminishing the energy contributed by the noise frequencies to create a modified reference signal; and
using the modified reference signal and the received signal to determine location.

62. The method as in claim 61, wherein the modifying is carried out in the frequency domain, by modifying coefficients of a Fourier Transform of said reference signal at one or more of the noise frequencies.

63. The method as in claim 62, wherein the Fourier Transform is computed using a fast fourier transform (FFT') algorithm.

64. The method of the claim 62, further comprising performing an inverse Fourier Transform to generated the modified reference signal.

65. The method of claim 61, wherein the received signal and said reference signal are digital signals.

66. The method of claim 61, wherein the threshold value relates to the absolute values of the coefficients of the Fourier Transform.

67. The method of claim 61, wherein the threshold value relates to a sum of the squares of the coefficients of the Fourier Transform.

68. The method of claim 61, wherein said reference signal is a periodic signal, and wherein the modifying is applied to one period of the reference signal.

69. The method of claim 61, wherein the portions of the received signal each have a duration different than the duration of the reference signal.

70. The method of claim 69, wherein the reference signal comprises a periodic signal having a period less than the duration of each of the selected portions of the received signal.

71. The method of claim 61, further comprising preprocessing the received signal prior to the selecting.

72. The method of claim 71, wherein the preprocessing comprises shifting the received signal to a base band signal.

73. The method of claim 71, wherein the preprocessing comprises shifting the received signal to an intermediate frequency.

74. The method of claim 61, wherein each of the selected portions of the received signal is less than $\frac{1}{10}$ in duration relative to the total duration of the received signal.

75. The method of claim 61, wherein the noise frequencies diminished in said reference signal comprise a first frequency, a second frequency and a third frequency, and the distance between the first and the second frequencies being substantially the same as the distance between the second and the third frequencies.

76. The method as in claim 61, wherein the received signal is a GPS signal.

77. The method as in claim 61, wherein the received signal is received in a mobile device in communication with a server over a data network, and wherein one or more of the selecting, using and modifying is carried out in the server.

* * * * *